(12) United States Patent
Takahashi

(10) Patent No.: US 7,980,769 B2
(45) Date of Patent: Jul. 19, 2011

(54) VACUUM OPTICAL FIBER CONNECTOR AND OPTICAL FIBER TERMINAL STRUCTURE

(75) Inventor: Tomotaka Takahashi, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 29 days.

(21) Appl. No.: 12/400,275

(22) Filed: Mar. 9, 2009

(65) Prior Publication Data

US 2009/0232454 A1 Sep. 17, 2009

(30) Foreign Application Priority Data

Mar. 11, 2008 (JP) ................. 2008-061702

(51) Int. Cl.
*G02B 6/40* (2006.01)
*G02B 6/00* (2006.01)
(52) U.S. Cl. .......................... 385/54; 385/138
(58) Field of Classification Search .................. 385/138
See application file for complete search history.

(56) References Cited

U.S. PATENT DOCUMENTS

| 4,360,249 A * | 11/1982 | Slemon ........................... 385/51 |
| 4,822,130 A * | 4/1989 | Maranto et al. .............. 385/138 |
| 4,859,021 A | 8/1989 | Wall |
| 5,241,612 A | 8/1993 | Iwama |
| 5,588,086 A | 12/1996 | Fan |
| 6,445,867 B1 | 9/2002 | Gilliland et al. |
| 2004/0047582 A1 | 3/2004 | Nasiri et al. |

FOREIGN PATENT DOCUMENTS

| EP | 1 879 060 A1 | 1/2008 |
| JP | A-2004-61944 | 2/2004 |
| WO | WO 2007/009676 A1 | 1/2007 |

OTHER PUBLICATIONS

Murashita, "Optical System for Tunneling-Electron Luminescence Spectro/Microscopes with Conductive-Transparent Tips in Ultrahigh Vacuums," Journal of Vacuum Science and Technology, 1999, pp. 22-28, vol. 17-No. 1, American Vacuum Society.

* cited by examiner

*Primary Examiner* — Sarah Hahm
(74) *Attorney, Agent, or Firm* — Oliff & Berridge, PLC

(57) ABSTRACT

A vacuum optical fiber connector includes a port flange attached to a vacuum flange for housing a first waveguide connector to which an optical fiber bundle is attached, an optical transparent body placed on the outside of the port flange, and an attachment member formed with a fit shape relative to the port flange for housing a second waveguide connector to which an optical fiber bundle is attached. The first and second waveguide connectors are positioned at least in two directions orthogonal to an optical axis with optical coupling of the first and second waveguide connectors.

5 Claims, 4 Drawing Sheets

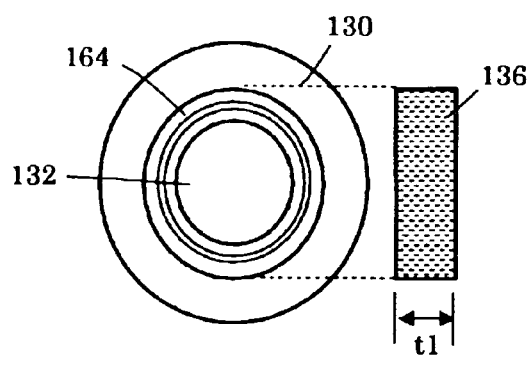
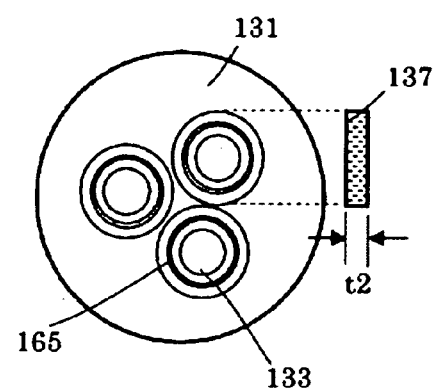
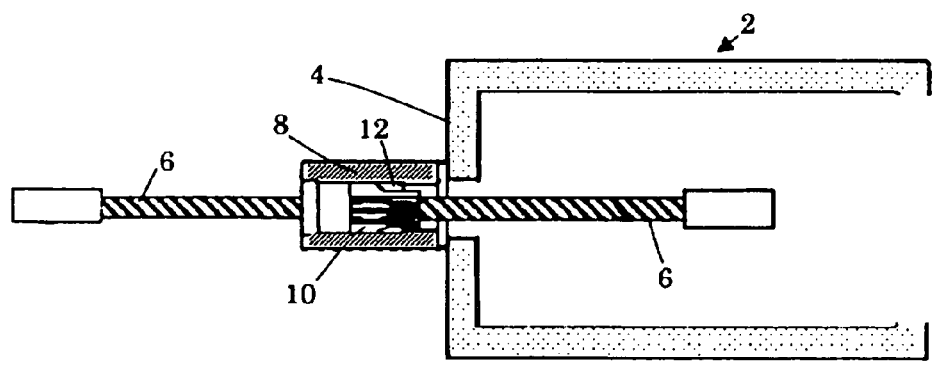

VACUUM OPTICAL FIBER CONNECTOR AND OPTICAL FIBER TERMINAL STRUCTURE

TECHNICAL FIELD

The invention relates to a vacuum optical fiber connector and an optical fiber terminal structure. In particular, the invention relates to a vacuum optical fiber connector adapted to facilitate replacement of a defective component, suited for use as a vacuum optical fiber connector for taking out measurement information from the inside of a vacuum device to the outside thereof with an optical fiber bundler and an optical fiber terminal structure.

RELATED ART

To build a length measurement sensor, etc., (photoelectric encoder, laser interferometer, etc.,) in the inside of a vacuum device such as an electron microscope, an electron-beam lithography system, a sputter, an evaporative apparatus, or a vacuum exposure apparatus and take out measurement information from the inside of the vacuum device to the outside thereof with an optical fiber bundle, optical fiber connection of the inside of the vacuum device and the outside thereof becomes important. Basically, the coating portion of the optical fiber bundle may be removed, the optical fiber bundle may be adhered to a vacuum flange of the vacuum device in the uncovered state, and vacuum sealing may be performed; a configuration, for example, shown in patent document 1 is proposed from the viewpoint of the strength for the maintenance of vacuum, etc. The configuration is schematically shown in FIG. 7 and will be discussed below:

As shown in FIG. 7, a vacuum flange 4 of a vacuum device 2 is provided with an opening and a tubular holder 8 is attached and fixed to the outside of the vacuum device 2 of the opening so as to prevent vacuum leaking. The coating of an optical fiber bundle 6 is removed at a midpoint and an adhesive is applied into the portion and a fixed pipe 10 is fixed. An O ring 12, etc., is inserted between the holder 8 and the fixed pipe 10 and the fixed pipe 10 is press-fitted into the holder 8. Thus, if the vacuum device 2 is placed in a vacuum state, the adhesive exists between the optical fiber bundle 6 and the fixed pipe 10 and the O ring 12 exists between the fixed pipe 10 and the holder 8, so that the inside of the vacuum device 2 can be maintained in the vacuum state relative to the atmosphere.

[Patent document 1] Japanese Patent Laid-Open No. 2004-61944

However, the method of maintaining vacuum shown in patent document 1 requires knowledge and preparation for the adhesive to be used and filling and adhering work, etc., because the optical fiber bundle 6 is adhered to the fixed pipe 10. That is, to ensure the performance of sealing (hermeticity) and remove the effect of outgas, etc., on the vacuum device, etc., an adhering skill is required and sealing work takes a lot of time and labor. Thus, it is extremely difficult for the user of the vacuum device to repair and improve members involved in the optical fiber bundle 6.

If a part of the members involved in the optical fiber bundle 6 on the atmosphere side (the outside of the vacuum device 2) is broken and is replaced, there is a problem in that the vacuum device 2 must be stopped, the inside of the vacuum device 2 must be released into the atmosphere, and the member involved in the optical fiber bundle 6 existing inside the vacuum device 2 must also be replaced.

SUMMARY

It is an object of the invention to provide a vacuum optical fiber connector and an optical fiber terminal structure for enabling measurement information of a measuring instrument (an encoder, etc.,) to be taken out from the inside of a vacuum device to the outside thereof with an optical fiber bundle without impairing hermeticity of the vacuum device, allowing easy replacement if a member involved in the optical fiber bundle is broken on the atmosphere side, and eliminating the need for releasing the vacuum device into the atmosphere.

According to the invention of a first aspect, there is provided a vacuum optical fiber connector for taking out measurement information from the inside of a vacuum device to the outside thereof with an optical fiber bundle, the vacuum optical fiber connector comprising:

a first waveguide connector, to which an optical fiber bundle in the vacuum device is attached;

a port flange to be attached to a vacuum flange of the vacuum device, the port flange housing the first waveguide connector;

a second waveguide connector, to which an optical fiber bundle outside the vacuum device is attached;

an attachment member fit to the port flange, the attachment member housing the second waveguide connector; and an optical transparent body placed between the port flange and the attachment member, wherein the first waveguide connector and the second waveguide connector are positioned at least in two directions orthogonal to an optical axis with optical coupling of the first waveguide connector and the second waveguide connector opposed to each other with the optical transparent body between.

In the invention of a second aspect, the port flange includes an auxiliary member for holding the first waveguide connector and a connection flange for positioning the auxiliary member at least in two directions orthogonal to the optical axis and housing the auxiliary member.

In the invention of a third aspect, the optical transparent body is parallel flat glass having both sides subjected to antireflection treatment.

According to the invention of a fourth aspect, there is provided an optical fiber terminal structure comprising:

the optical fiber bundle including a plurality of optical fibers;

a pipe body having a plurality of holes, into which the optical fibers are inserted and fixed, respectively; and a single antireflection plate subjected to antireflection treatment, the antireflection plate attached to end faces of the optical fibers inserted and fixed into the pipe body According to the invention, it is made possible to build an optical fiber bundle in a vacuum device without impairing hermeticity of the vacuum device. The invention can eliminate the need for special hermetic sealing treatment of skilled handling of an adhesive, etc., because of a vacuum seal structure similar to a general vacuum window (viewing port) attached to a vacuum flange of a vacuum device. Thus, a taking back step for a repair, etc., is not required. The members involved in the optical fiber bundle are independent inside and outside the vacuum device and thus can be easily attached and detached. Thus, maintainability of parts replacement, repair, etc., can be enhanced.

At the same time, the special adhering cost to maintain hermeticity, the replacement cost of all members for partial breakage, the cost involved in releasing vacuum of the vacuum device, etc., can be reduced and it is made possible to reduce the cost particularly for maintaining after introduction of the vacuum optical fiber connector according to the invention.

BRIEF DESCRIPTION OF THE DRAWINGS

In the accompanying drawings:

FIGS. 6A and 6B are schematic drawings of connection flanges according to first to fourth embodiments of the invention; and FIG. 7 is a schematic drawing to represent a vacuum device and an optical fiber bundle according to a related-art.

DETAILED DESCRIPTION

Embodiments of the invention will be discussed in detail with reference to the accompanying drawings.

Figure 1:
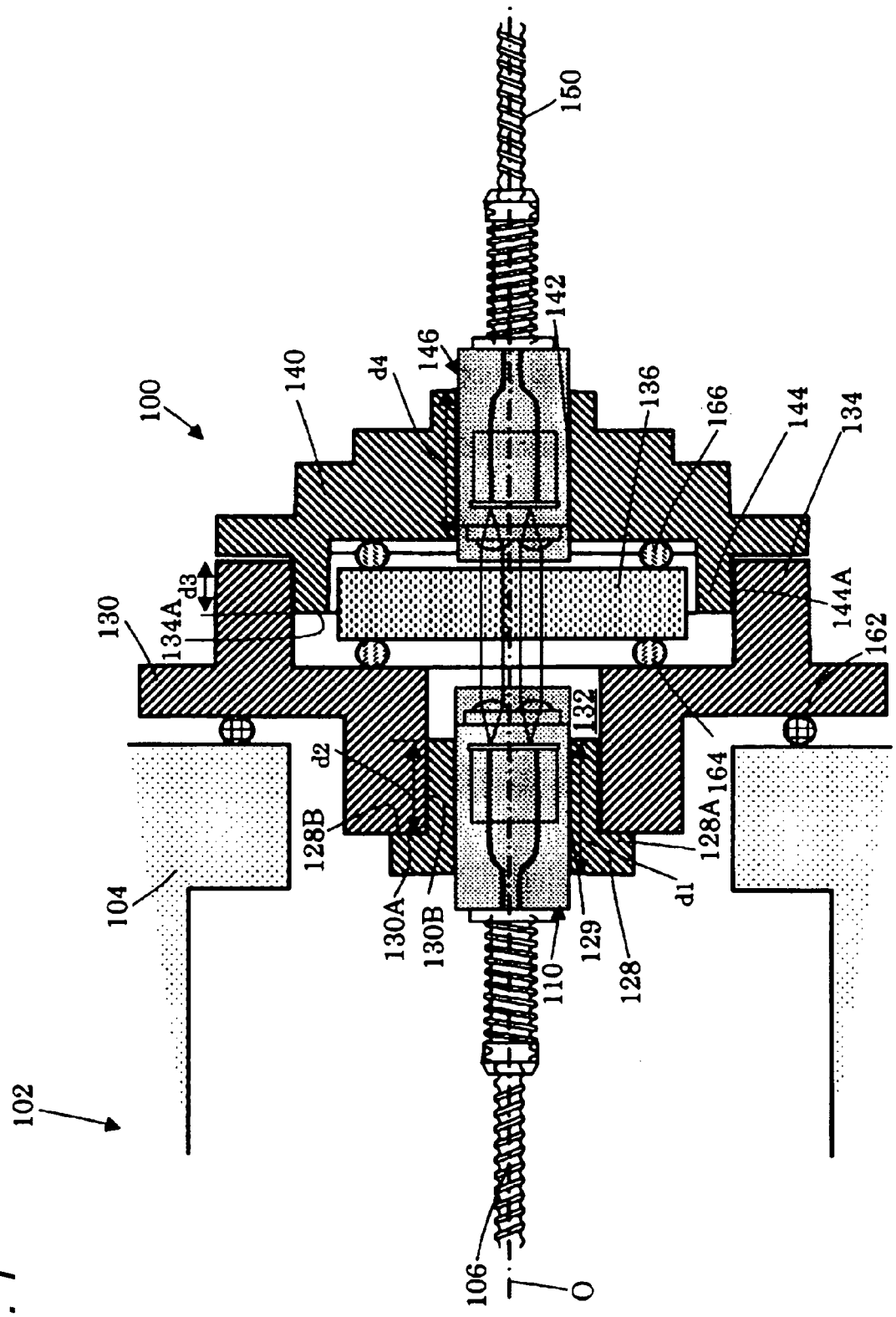
FIG. 1 is a schematic sectional view of a vacuum optical fiber connector according to a first embodiment of the invention.
Figure 2:
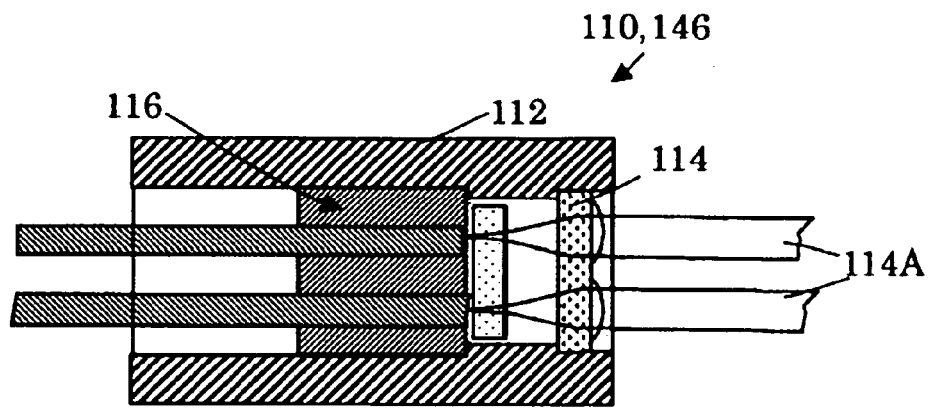
FIG. 2 is a schematic sectional view of a first waveguide connector according to the first embodiment of the invention.

A first embodiment of the invention will be discussed with FIGS. 1 to 3. FIG. 1 is a schematic sectional view of a vacuum optical fiber connector according to the first embodiment of the invention, FIG. 2 is a schematic sectional view of a first waveguide connector according to the first embodiment of the invention, and FIGS. 3A to 3D are schematic drawings of an optical fiber terminal structure and an antireflection body according to the first embodiment of the invention.

To begin with, the general structure of a vacuum optical fiber connector according to the embodiment will be discussed with FIG. 1.

A vacuum optical fiber connector 100 includes a port flange for housing a first waveguide connector 110 to which an optical fiber bundle 106 inside a vacuum device 102 is attached, an optical transparent body 136 placed on the outside of the port flange relative to the vacuum device 102, and an attachment member 140 formed with a fit shape (described later) relative to the port flange for housing a second waveguide connector 146 to which an optical fiber bundle 105 outside the vacuum device 102 is attached. The port flange includes an auxiliary member 128 for holding the first waveguide connector 110 and a connection flange 130 for positioning the auxiliary member 128 at least in two directions orthogonal to an optical axis O and housing the auxiliary member 128. The vacuum optical fiber connector 100 has the first waveguide connector 110 and the second waveguide connector 146 positioned at least in two directions orthogonal to the optical axis O with optical coupling of the first waveguide connector 110 and the second waveguide connector 146 opposed to each other with the optical transparent body 136 between. Thus, the vacuum optical fiber connector 100 allows measurement information provided in the vacuum device 102 to be taken out from the inside of the vacuum device 102 to the outside thereof with the optical fiber bundle 106, 150. The components will be discussed below in detail:

The port flange includes the auxiliary member 128 and the connection flange 130 as described above.

The auxiliary member 128 is a tubular member of a length d1 including a margin 128A provided with an opening 129 along the optical axis O, as shown in FIG. 1. When the auxiliary member 128 is fitted into an opening 132 of the connection flange 130, the margin 128A of the auxiliary member 128 is secured to a margin 130A of the opening 132 of the connection flange 130. A portion 128B in intimate contact with the margin 130A of the opening 132 is provided with a fit shape (not shown) with the optical axis O as the reference. The inner face of the opening 129 of the auxiliary member 128 is also provided with a fit shape (not shown) with the optical axis O as the reference. Thus, when the first waveguide connector 110 is detachably fitted into the opening 129, the auxiliary member 128 can position and fix a specific position of the first waveguide connector 110 (almost the center in the optical axis O direction). The auxiliary member 128 supports the first waveguide connector 110 over the length d1. Thus, if a stress orthogonal to the optical axis O is applied to the auxiliary member 128 by the optical fiber bundle 106, the first waveguide connector 110 is stably supported without a rattle with respect to at least two directions orthogonal to the optical axis O.

The connection flange 130 is a disk-shaped member provided with the opening 132 along the optical axis O, as shown in FIG. 1. The connection flange 130 is attached to a vacuum flange 104 of a size generally used through an O ring 162. Portions 130A and 130B of the connection flange 130 facing the auxiliary member 128 are provided with a fit shape (not shown) with the optical axis O as the reference corresponding to the portion 128B of the auxiliary member 128, and the auxiliary member 128 is detachably fitted into the fit shape. When the auxiliary member 128 is fitted, it can be positioned and fixed with the optical axis O as the reference. At this time, the portions 130A and 130B are in intimate contact with the portion 128B of the auxiliary member 128 at different angles (for example, right angle). Further, a length d2 of the auxiliary member 128 fitted into the opening 132 is long, for example, (d1/2)<d2. Thus, if a stress is applied to the auxiliary member 128 in a direction orthogonal to the optical axis O, the connection flange 130 can stably support the auxiliary member 128 in the optical axis O direction. The connection flange 130 supports the auxiliary member 128 over the length d2 and thus the periphery of the opening 132 is formed thick. An annular projection 134 with the optical axis O as the reference is formed on the connection flange 130 at a distance from the optical axis O, the opposite side to the vacuum flange 104.

The optical transparent body 136 is circular parallel flat glass having both sides formed each with an antireflection film for preventing reflection of light transmitted by the optical fiber bundle 106, 150, for example. The optical transparent body 136 is placed on the outside of the connection flange 130 (port flange) relative to the vacuum device 102 through an O ring 164 and on the inside of the projection 134 of the connection flange 130, as shown in FIG. 1. The optical transparent body 136 is precompressed and fixed to the connection flange 130 by the attachment member 140 through an O ring 166. The optical transparent body 136 is disposed between the connection flange 130 and the attachment member 140.

The attachment member 140 is a disk-shaped member provided with an opening 142 along the optical axis O, as shown in FIG. 1. The periphery of the opening 142 is formed thick (length d4) to support the second waveguide connector 146. The inner face of the opening 142 is provided with a fit shape (not shown) with the optical axis O as the reference. When the second waveguide connector 146 is fitted, the fit shape can detachably position and fix a specific position of the second waveguide connector 146 (almost the center in the optical axis O direction). The attachment member 140 supports the second waveguide connector 146 over the length d4. Thus, if a stress is applied by the optical fiber bundle 150, the second waveguide connector 146 can be stably supported without a rattle with respect to at least two directions orthogonal to the optical axis O.

The attachment member 140 includes an annular receptacle 144 corresponding to the projection 134 on the side of the connection flange 130 (fit shape relative to the projection 134 of the connection flange 130) and the annular receptacle 144 and the projection 134 form a counter lock structure, as shown in FIG. 1. Specifically, the receptacle 144 is provided with the optical axis O as the reference so as to come in contact with an inner face 134A of the projection 134 on the outer periphery of the optical transparent body 136. A shape for allowing the attachment member 140 to slide in the optical axis O direction without rotating relative to the connection flange 130 at one part or more of portions 134A and 144A where the projection 134 and the annular receptacle 144 come in contact with each other (for example, a shape for spline coupling, etc.,) is provided. The projection 134 may come in contact with the inside of the annular receptacle 144. At this time, the projection 134 and the annular receptacle 144 are in intimate contact with each other in a length d3 along the optical axis O, so that stable positioning is accomplished without a rattle in two axis directions orthogonal to the optical axis O. The vacuum flange 104, the connection flange 130, and the attachment member 140 are fixed each with a bolt in a proper part.

The first and second waveguide connectors (also simply called waveguide connectors) 110 and 146 are of the same structure and have each a casing 112, a collimator lens 114, and an optical fiber terminal structure 116, as shown in FIG. 2. The casing 112 supports the collimator lens 114 and the optical fiber terminal structure 116 inside the casing 112. The collimator lens 114 is a lens for converting light emitted from the optical fiber terminal structure 116 into collimated light 114A or allowing collimated light 114A to be incident on the optical fiber terminal structure 116.

Figure 3A:
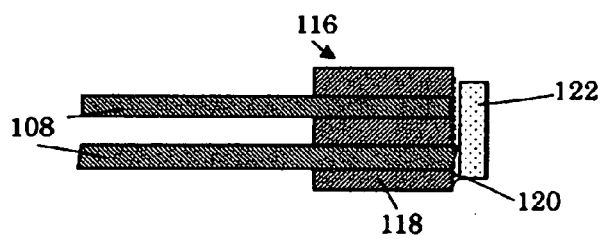
FIGS. 3A to 3D are schematic drawings of an optical fiber terminal structure and an antireflection body according to the first embodiment of the invention.
Figure 3B:
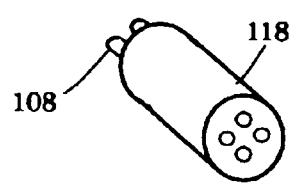

The optical fiber terminal structure 116 is provided by inserting and fixing individual optical fibers 108 separated from the optical fiber bundle 106, 150 into a pipe body 118 and adhering (attaching) an antireflection plate 122 to an end face of the pipe body 118 with an index matching material 120, as shown in FIG. 3A. The antireflection plate 122 is a piece provided by cutting an antireflection body 124 coated with an antireflection film for preventing reflection of light transmitted through the optical fiber 108 on one side of a general-purpose glass plate (for example, soda glass, etc.,) along a dashed line L, as shown in FIG. 3C. Thus, the antireflection body 124 is shaped like a flat plane, so that a large number of antireflection plates 122 can be manufactured in one lot and the antireflection plates 122 can be manufactured inexpensively and uniformly. An index matching material 120 is applied to the end face of a structure shown in FIG. 3B and the antireflection plate 122 cut from the antireflection body 124 is put on the end face to form the optical fiber terminal structure 116 in the embodiment shown in FIG. 3D. For example, a ferrule, etc. can be used as the pipe body 118. If the refractive index of the antireflection plate 122 is set to the same degree as that of the optical fiber 108, the effect of wave aberration is small and thus the loss in optical coupling can be minimized.

The function in the embodiment will be discussed below:
The connection flange 130 is connected to the vacuum flange 104 through the O ring 162 and the optical transparent body 136 is connected to the connection flange 130 through the O ring 164. If the vacuum device 102 is evacuated, the optical transparent body 136 is sucked to the side of the vacuum device 102 along the optical axis O; it becomes a similar situation to a vacuum window used with an ordinary vacuum device in a similar configuration. Thus, the degree of vacuum of the vacuum device 102 can be held high. At this time, since an adhesive for sealing vacuum in the vacuum device 102 is not used in the embodiment, if the optical fiber bundle 106 is built in the vacuum device 102, the vacuum device 102 can be kept in high vacuum without impairing hermeticity of the vacuum device 102 because of insufficient sealing or outgas caused by an adhesive. Since an adhesive is not used, the need for skilled treatment for handling the adhesive can be eliminated. Thus, a taking back step for a repair, etc., is not required. The members involved in the optical fiber bundle 106, 150 are independent inside and outside the vacuum device 102 and thus can be easily attached and detached. Thus, if any member involved in the optical fiber bundle 150 on the atmosphere side (the outside of the vacuum device 102) is broken, the member is easily replaced with a new one and the vacuum device 102 need not be released into the atmosphere. That is, maintainability of parts replacement, repair, etc., can be enhanced.

At the same time, the special adhering cost to maintain hermeticity, the replacement cost of all members for partial breakage, the cost involved in releasing vacuum of the vacuum device, etc., can be reduced and it is made possible to reduce the cost particularly for attachment maintaining after introduction of the vacuum optical fiber connector 100.

At this time, the first waveguide connector 110 and the second waveguide connector 146 include each the collimator lens 114 on the face opposed to each other. That is, if the distance between the first waveguide connector 110 and the second waveguide connector 146 varies in the optical axis O direction, mutual optical coupling can be well held. Thus, the embodiment can reliably introduce measurement information inside the vacuum device 102 into the outside of the vacuum device 102 and is suited particularly for use for power light transmission.

The securing and fit structures in the waveguide connectors 110 and 146, the auxiliary member 128, the connection flange 130, and the attachment member 140 are all based on the optical axis O and thus the first waveguide connector 110 and the second waveguide connector 146 are positioned with high accuracy, so that furthermore efficient optical coupling can be realized.

In the connection flange 130 and the attachment member 140, the annular receptacle 144 and the projection 134 form a counter lock structure and thus if the attachment meter 140 is repeatedly attached and detached, the position reproducibility of the attachment member 140 is good, so that highly efficient optical coupling can be reproduced.

The connection flange 130 is manufactured matching the vacuum flange 104 of the size generally used and thus can also be used with a vacuum flange of the size generally used, of any other vacuum device. The waveguide connectors 110 and 146 are of the same structure and thus can be used each as another waveguide connector (110, 146) and the vacuum optical fiber connector 100 can be manufactured at low cost. The first waveguide connector 110 and the auxiliary member 128, the auxiliary member 128 and the connection flange 130, the vacuum flange 104 and the connection flange 130, the connection flange 130 and the attachment member 140, and the attachment member 140 and the second waveguide connector 146 can be attached and detached as desired, so that only the broken member can be replaced easily and rapidly.

The antireflection plates 122 are put on the end faces of the optical fibers 108 supported in the pipe body 118 collectively with the index matching material 120. Thus, it is easy to make uniform the direction of light emitted from the end face of each optical fiber 108 with no variations. Ununiformity in the thicknesses of the antireflection films in the end faces of the optical fibers 108 and antireflection film variations from one optical fiber 108 to another can be decreased as compared with the case where the antireflection film is formed on the end faces of the optical fibers 108. Further, a special low-temperature film formation device for forming an antireflection film on the end face of the optical fiber 108 is not required and a general-purpose glass plate can be used. That is, the antireflection plates 122 can be manufactured at low cost at high yield using a general-purpose film formation facility. If formation of an antireflection film results in failure, it is easy to reproduce a glass plate and it is also easy to again form a film from the beginning. Further, the optical fiber terminal structure 116 includes a plurality of optical fibers 108, so that the amount of information transmitted through the optical fibers 108 can be increased drastically. Since the antireflection plate 122 is attached to the end faces of the optical fibers 108 held in the pipe body 118 through the index matching material 120, the end face of the optical fiber 108 may be subjected to flat grinding or highly accurate cutting (splice cutting) or can also be used only with end face cut rather than such a flat end face. That is, the optical fiber terminal structure 116 can provide an optical fiber terminal structure with a less light loss at low cost as compared with the case where an antireflection film is put directly on a single optical fiber and these optical fibers are bundled.

Figure 4A:
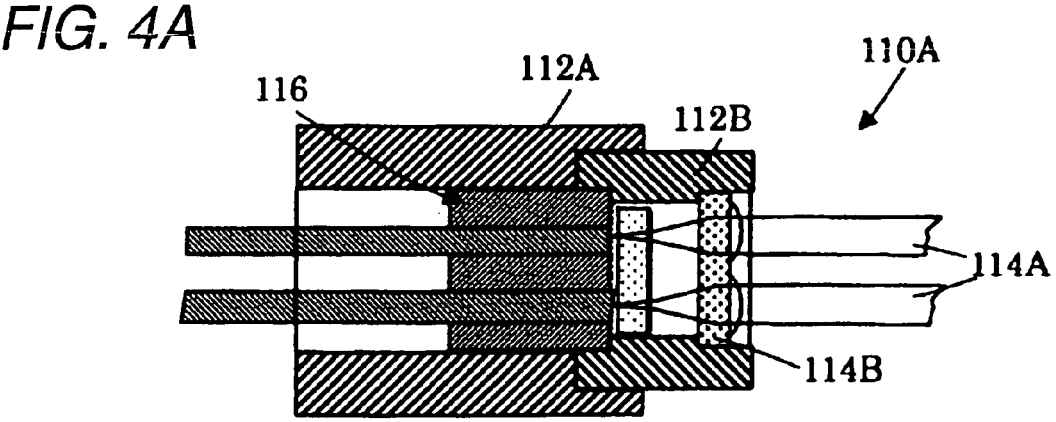
FIGS. 4A and 4B are schematic sectional views of a waveguide connector according to a second embodiment of the invention.
Figure 4B:
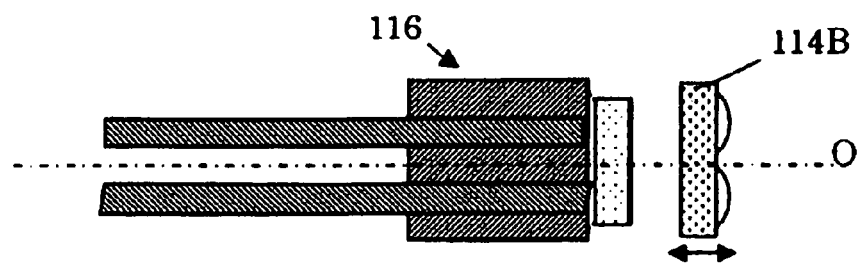

In the embodiment, the waveguide connector 110, 146 supports the collimator lens 114 and the optical fiber terminal structure 116 by the casing 112 as shown in FIG. 2, but the invention is not limited to the mode. For example, in a second embodiment of the invention shown in FIG. 4A, a waveguide connector 110A supports a lens support 112B supporting a collimator lens 114B and an optical fiber terminal structure 116 by a casing 112A. In this structure, the collimator lens 114B can be replaced as desired and easily. For example, as shown in FIG. 4B, the collimator lens 114B can be changed in the optical axis O direction so that it becomes optimum in response to an optical system. That is, as the lens involved in spatial waveguide, a commercially available lens may be used or a special lens may be used, so that the flexibility of specification change of lens design can be largely widened.

Figure 3D:
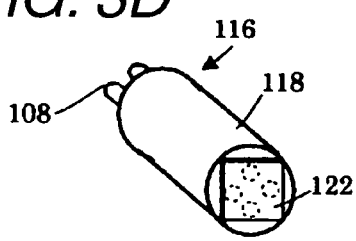
Figure 3C:
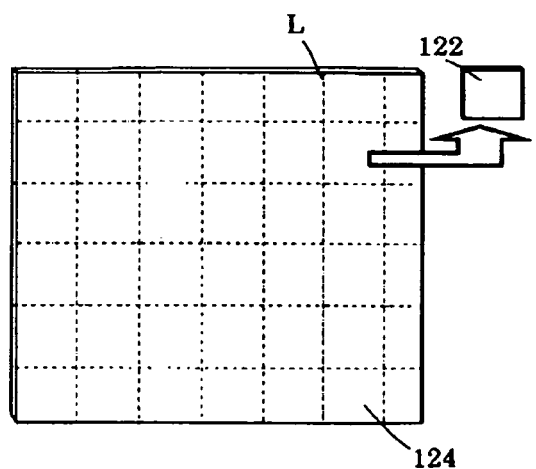
Figure 5A:
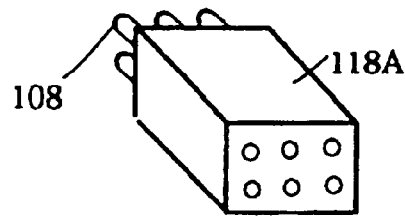
FIGS. 5A and 5B are schematic drawings of an optical fiber terminal structure according to a third embodiment of the invention.
Figure 5B:
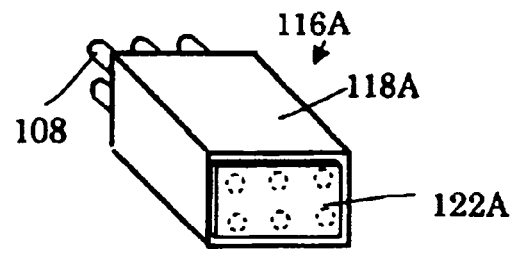

In the embodiment described above, the pipe body 118 is shaped like a cylinder as shown in FIG. 3D, but the invention is not limited to the shape. A pipe body 118A may be shaped like a rectangular parallelepiped as in a third embodiment of the invention shown in FIG. 5B. In this case, an antireflection plate 122A cut matching the outer shape of the pipe body 118A is put on a structure shown in FIG. 5A for use.

In the embodiment described above, only one opening 132 is included with the optical axis O of the connection flange 130 as the center as shown in FIG. 6A, but the invention is not limited to the mode. For example, in a fourth embodiment of the invention shown in FIG. 6B, three openings 133 are included in the connection flange 131 and the invention can also be applied to any one or more of the openings 133. In this case, as shown in FIG. 6B, a thickness t2 of an optical transparent body 137 can be lessened as compared with a thickness t1 of the optical transparent body 136 applied to the first to third embodiments. At this time, it is also possible to adopt a configuration wherein first and second waveguide connectors can be optically coupled without using any collimator lens. In contrast, if optical coupling of light collimated through a collimator lens is good, the glass thickness t1, t2 can also be made thick. In FIG. 6B, the reference number 165 indicates O ring placed between the optical transparent body 137 and the connection flange 131.

In the embodiment described above, the O rings 162, 164, and 166 are used for vacuum sealing, but the invention is not limited to the mode. For example, an elastomer seal, a gasket, etc., can also be used.

In the embodiment described above, the positioning structure of the first waveguide connector 110 and the auxiliary member 128, the auxiliary member 128 and the connection flange 130, the connection flange 130 and the attachment member 140, and the attachment member 140 and the second waveguide connector 146 is a fit shape, etc., but the invention is not limited to the shape. For example, a positioning pin, a quench-hardened pin with high accuracy, a kind of parallel pin (dowel pin), etc., can also be used for positioning. In positioning the connection flange 130 and the attachment member 140, a counter lock structure is described, but the structure is not limited to the structure of the projection 134 and the annular receptacle 144 shown in FIG. 1; it is any if it satisfies a fit shape widely.

In the embodiment described above, the first waveguide connector 110 and the second waveguide connector 146 are of the same structure, but the invention is not limited to the mode. For example, the first waveguide connector 110 may be implemented as a casing integral with an auxiliary member and the second waveguide connector 146 may be implemented as a casing integral with an attachment member and each may be detachable.

In the embodiment described above, the optical transparent body 136 is parallel flat glass having both sides subjected to antireflection treatment, but the invention is not limited to the mode. For example, the optical transparent body may be any if it has an outer shape having no effect on optical waveguiding at the bending time when the vacuum device is evacuated.

In the embodiment described above, the index matching material 120 has adhesion, but the invention is not limited to the mode. For example, the index matching material may be grease or oil. In this case, a mechanism part can also be provided outside an optical fiber terminal structure for supporting an antireflection plate.

In the embodiment described above, the optical fiber bundle 106, 150 is made up of the optical fibers 108, but the invention is not limited to the mode. For example, one optical fiber may form an optical fiber bundle.

What is claimed is:

1. A vacuum optical fiber connector for taking out measurement information from an inside of a vacuum device to an outside thereof with an optical fiber bundle, the vacuum optical fiber connector comprising:
    a first waveguide connector, to which an optical fiber bundle in the vacuum device is attached;
    a port flange attached to a vacuum flange of the vacuum device, the port flange housing the first waveguide connector;
    a second waveguide connector, to which an optical fiber bundle outside the vacuum device is attached;
    an attachment member fit to the port flange, the attachment member housing the second waveguide connector; and an optical transparent body:
placed between the port flange and the attachment member,
located entirely between the first waveguide connector and the second waveguide connector, and
vacuum sealed by contact to the port flange and the attachment member through O rings,
wherein the first waveguide connector and the second waveguide connector are positioned at least in two directions orthogonal to an optical axis with optical coupling of the first waveguide connector and the second waveguide connector opposed to each other with the optical transparent body between.

2. The vacuum optical fiber connector as claimed in claim 1 wherein the port flange comprises an auxiliary member holding the first waveguide connector, and a connection flange positioning the auxiliary member at least in two directions orthogonal to the optical axis and housing the auxiliary member.

3. The vacuum optical fiber connector as claimed in claim 1 wherein the optical transparent body is parallel flat glass having both sides subjected to antireflection treatment.

4. The vacuum optical fiber connector as claimed in claim 1 wherein the port flange has an annular projection and the attachment member has an annular receptacle corresponding to the projection.

5. The vacuum optical fiber connector as claimed in claim 1 wherein the optical transparent body is located entirely outside the vacuum device.

* * * * *